(12) United States Patent
Hanemaaijer

(10) Patent No.: US 6,334,956 B1
(45) Date of Patent: Jan. 1, 2002

(54) ADSORPTION OR DESORPTION OF DISSOLVED CONSTITUENTS IN LIQUIDS AND APPARATUS THEREFOR

(75) Inventor: Jan Hendrik Hanemaaijer, Oosterbeeek (NL)

(73) Assignee: Nederlandse Organisatie Voor Toegepast-Natuurwetenschappelijk Onderzoek (TNO), Delft (NL)

(*) Notice: Subject to any disclaimer, the term of this patent is extended or adjusted under 35 U.S.C. 154(b) by 0 days.

(21) Appl. No.: 09/463,740
(22) PCT Filed: Jul. 13, 1998
(86) PCT No.: PCT/NL98/00404
§ 371 Date: Mar. 22, 2000
§ 102(e) Date: Mar. 22, 2000
(87) PCT Pub. No.: WO99/06132
PCT Pub. Date: Feb. 11, 1999

(30) Foreign Application Priority Data

Jul. 31, 1997 (NL) ............................................. 1006701

(51) Int. Cl.[7] ............................................. B01D 15/08
(52) U.S. Cl. .................. 210/656; 210/673; 210/676; 210/679; 210/198.2; 210/268; 210/274; 210/286
(58) Field of Search ................. 210/635, 656, 210/659, 670, 673, 675, 676, 679, 268, 269, 274, 286, 198.2

(56) References Cited

U.S. PATENT DOCUMENTS

| | | | |
|---|---|---|---|
| 2,954,305 A | | 9/1960 | Grosvenor ............... 127/55 |
| 3,003,641 A | | 10/1961 | Laughlin ............... 210/189 |
| 3,163,597 A | * | 12/1964 | Thrun ............... 210/679 |
| 3,560,378 A | * | 2/1971 | Weiss ............... 210/679 |
| 3,607,740 A | * | 9/1971 | Akeroyd ............... 210/679 |
| 4,133,759 A | * | 1/1979 | Ikeda ............... 210/104 |
| 4,137,162 A | * | 1/1979 | Mohri ............... 210/40 |
| 4,201,695 A | | 5/1980 | Jüntgen ............... 252/411 |
| 4,250,141 A | * | 2/1981 | Lehmann ............... 210/679 |
| 4,293,423 A | * | 10/1981 | Kosaka ............... 210/676 |
| 4,412,923 A | * | 11/1983 | Capitani ............... 210/676 |
| 4,472,282 A | * | 9/1984 | Crits ............... 210/679 |
| 4,645,604 A | * | 2/1987 | Martinola ............... 210/679 |
| 4,957,627 A | * | 9/1990 | Fortuin ............... 210/679 |
| 5,346,624 A | * | 9/1994 | Libutti ............... 210/679 |
| 5,698,106 A | * | 12/1997 | Larsson ............... 210/675 |

FOREIGN PATENT DOCUMENTS

| | | | | |
|---|---|---|---|---|
| DE | 27 40 768 | | 3/1978 | ............... 210/679 |
| EP | 0 264 990 | | 4/1988 | ............... 210/679 |
| GB | 2 007 814 | | 5/1979 | ............... 210/679 |
| NL | 7609684 | | 5/1977 | ............... 210/679 |

* cited by examiner

Primary Examiner—Ernest G. Therkorn
(74) Attorney, Agent, or Firm—Young & Thompson

(57) ABSTRACT

To adsorb, on solid adsorbent particles, constituents dissolved in liquid, or to desorb (extract), from solid desorbent particles, soluble constituents in liquid, in a container a packed bed formed from granular material is mixed with adsorbent particles or desorbent particles smaller than 200 μm, said bed moves downwards by virtue of gravity, said liquid is passed upwards through the bed by means of a pressure differential, the said dissolved constituents being adsorbed on the solid adsorbent particles or the said soluble constituents being extracted from the desorbent particles.

12 Claims, 1 Drawing Sheet

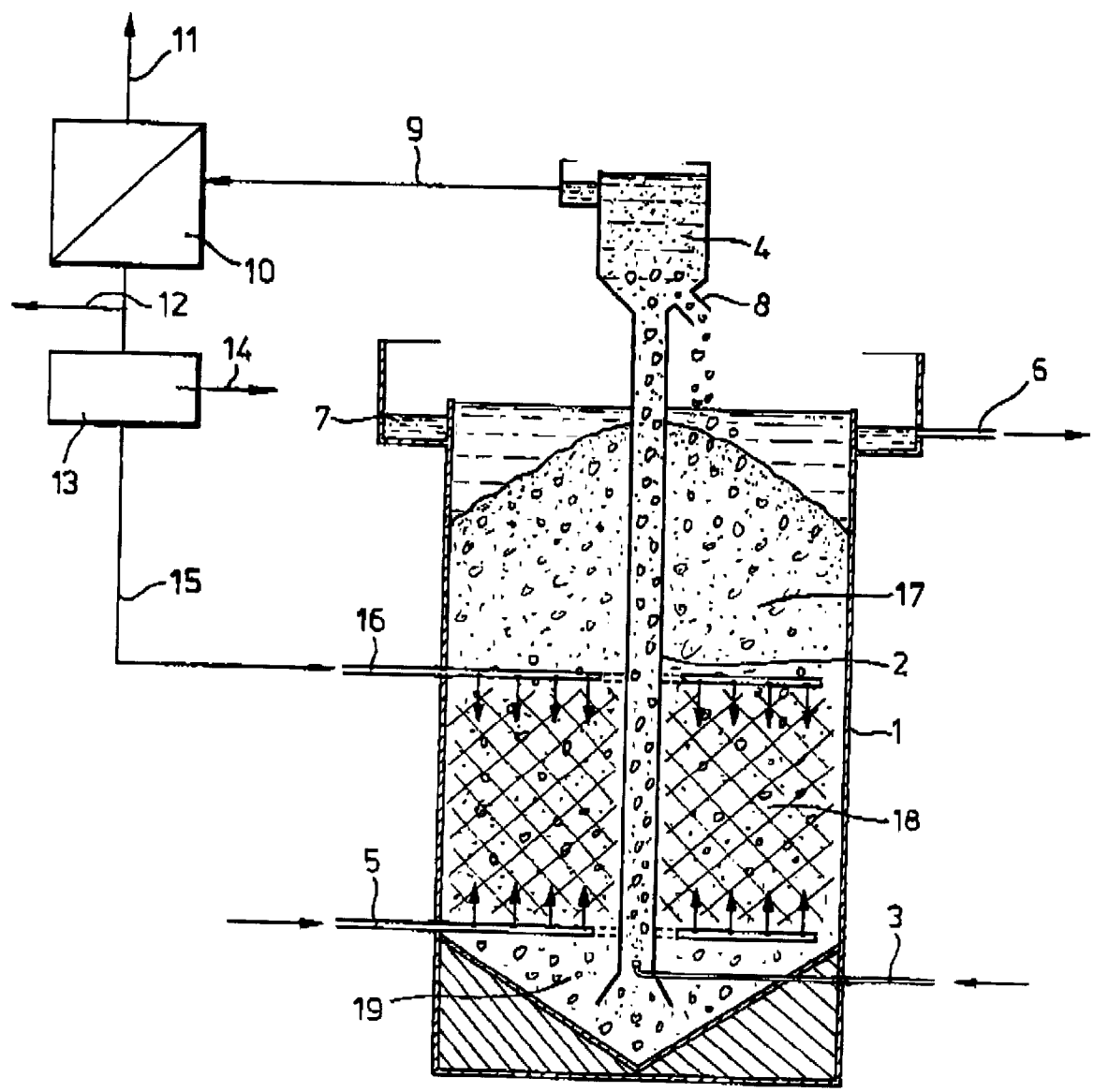

ADSORPTION OR DESORPTION OF DISSOLVED CONSTITUENTS IN LIQUIDS AND APPARATUS THEREFOR

REFERENCE TO RELATED APPLICATIONS

This application is a 371 of PCT/NL98/00404 filed Jul. 13, 1998.

The invention relates to a method for adsorbing, on solid adsorbent particles, constituents dissolved in liquid or for desorbing (extracting), from solid desorbent particles, soluble constituents in liquid. The said constituents will often be organic in nature, but inorganic components, in particular heavy metals, are not excluded.

In trade and industry water is used in very large quantities, for example as a relatively inexpensive means of transportation, solvent, cleaning medium, coolant etc. The water often contains a range of dissolved substances which have been added deliberately in the form of base materials or adjuvants, or which have ended up therein as a result of reactions or inevitable contact with products or materials which may or may not have been contaminated. The discharge of water used for process purposes is allowed to take place only if the quality meets the antipollution requirements laid down by the authorities. These requirements are gradually being tightened. Consequently, there is an increasing demand, in various industrial sectors, for methods by means of which the process water and possible other liquids can be utilized more efficiently, or can be kept in use or circulation for longer periods.

A number of methods is known by means of which organic substances and/or inorganic substances can be removed or recovered selectively from aqueous mixtures. Examples include solvent extraction, distillation, stripping, filtration using diatomaceous earth, adsorption on activated carbon, chemical oxidation, membrane separation processes and biological processes. These methods have limited applicability and/or limited selectivity or have other drawbacks such as high energy consumption, secondary emissions or excessive costs for treating small volumes.

Selective adsorption with the aid of adsorption chromatography might provide a way out, albeit that this method has serious drawbacks. Owing to batchwise processing, the required amounts of adsorbent often constitute the limiting factor. Furthermore, many process water streams have high flow rates, which means that the use of large adsorption columns is undesirable on financial grounds.

Also used on a large scale in trade and industry is solids extraction, inter alia for producing edible oils from oleiferous seeds, producing instant coffee or tea, leaching ores, treating of contaminated sludges, producing valuable water- or alcohol-soluble components from a large range of raw materials, treating/washing particles. To this end, continuous apparatuses are often used, based on the percolation or immersion principle, such as the so-called Rotocel extractor (a segmented carousel), perforated-belt/compartmented extractors, rotating-disc extractors, screw extractors etc. These methods all have the drawback that they can not, or not effectively, be used with small particles to be extracted (smaller than 200 $\mu$m), particularly if these are compressible and have a density which does not greatly exceed that of the extraction fluids. Packed percolation beds then become clogged and/or insufficient separation takes place between the particles and the liquid, as a result of which good, rapid countercurrent extraction is not obtained. On the other hand, the use of small particles is desirable precisely because the factors impeding diffusion are greatly restricted thereby and it would be possible to perform the extraction much more rapidly and/or at a lower, milder temperature.

It is an object of the invention to provide a method as indicated in the preamble, wherein the abovementioned drawbacks are avoided.

According to the invention, the method is characterized in that in a container a packed bed is formed from granular material, mixed with adsorbent particles or desorbent particles smaller than 200 $\mu$m, in that said bed moves downwards by virtue of gravity, in that said liquid is directed upwards through the bed by means of a pressure differential, said dissolved constituents being adsorbed on the solid adsorbent particles or the soluble constituents being extracted from the desorbent particles.

The adsorbent particles or desorbent particles are introduced into a bed of coarser granular material, as a result of which even small, compressible and/or light particles are completely enclosed in the granular-material bed and this bed is discharged downwards as a packed bed, coming into countercurrent contact with a liquid flowing upwards, the result being a countercurrent adsorption chromatography process or a countercurrent extraction process. These processes, now that small particles can be used, will require a much shorter contact time than the processes known hitherto, as a result of which the throughput of the liquid to be treated or the throughput of the particles to be treated by means of extraction can be greater than is customary in known processes. It may be possible for extraction processes to take place at milder process conditions, as a result of which the product quality can increase. Equally, the residence time can be shortened and operations can, for example, be carried out at a lower temperature. Furthermore it may be possible to use environment-friendly extraction fluids. In the case of adsorption chromatography there is the option for different adsorbent particles to be used simultaneously, as a result of which the selectivity of various dissolved constituents to be removed or to be extracted can be increased. Furthermore, the process can be combined with the removal of undissolved constituents from the liquid stream to be treated, which is a known use of moving packed beds of granular material. In that case the adsorbent particles should be chosen so as to allow simple separation between particles and undissolved constituents to be removed (lamellar settling, hydrocycloning, flotation etc.).

The granular material used will normally be sand having a diameter of between 0.3 and 5 mm; other granular materials (glass, metal, plastic) can also be used, however. Its function is not to filter the influent but to effect downward transport, countercurrent to the liquid to be treated, of the small particles which, because of the sand, essentially maintain their position. The countercurrent of the liquid and the particles in particular results in high efficiency being achieved.

The packed bed can comprise the following sections:
- a top section which comprises inert granular material and imparts stability to the bed,
- an adsorbent or desorbent middle section comprising inert granular material mixed with adsorbent particles or desorbent particles, and
- a bottom section which is to be discharged and comprises inert granular material and laden adsorbent particles or desorbent particles.

Preferably, the adsorbent particles or desorbent particles are fed in approximately between the top and middle bed section in a concentrated slurry by means of an injection distribution means and the influent is introduced approximately between the bottom and middle bed section and the effluent is removed from the top bed section.

Preferably, granular material containing the adsorbent particles or desorbent particles is transported from the bottom bed section to a point above the top bed section, the granular material and the adsorbent particles or desorbent particles are subsequently separated from one another, the separated-off granular material is passed into the top bed section and the separated-off adsorbent particles or desorbent particles are discharged.

The transport of the adsorbent particles or desorbent particles to a point above the top bed section can make use, for example, of a gas-lift pump effect, which involves a pressurized gas being passed into the bottom end of a central pipe. Other transport means are also possible, however, (screw conveyor, slurry pump, conveyor belt and the like). The riser could also be positioned outside the tank.

If the method is used for adsorbing, on solid particles, constituents dissolved in liquid, the laden adsorbent particles are regenerated and recycled into the process.

Preferably, the laden adsorbent particles are concentrated prior to being regenerated.

The regeneration in this context can take place by means of desorption with the aid of an acid, alkali or solvent, by an increase in temperature or with the aid of catalytic oxidation using ozone, peroxide or some other oxidant.

The invention also relates to an apparatus for bringing small solid particles in a liquid stream into contact countercurrently, in particular for implementing the method according to any one of the preceding claims, characterized by a column containing a packed bed comprising three layers whose bottom two layers comprise granular material with small adsorbent particles or desorbent particles trapped in between and the top layer comprises a covering layer of granular material, means for discharging the bottom layer, as a result of which the packed bed moves slowly downwards at a controlled velocity, means for injecting and distributing a liquid between the bottom and middle layer and for discharging said liquid above the top layer, means for injecting, between the middle and top layer, a concentrated slurry dispersion of small particles and distributing it in such a way that these particles are entrained through the downward-moving packed bed, countercurrent to a liquid flowing upwards, means for separating the discharged slurry, which comprises granular material and small particles forming the bottom layer, into granular material and small particles.

Such an apparatus can be used quickly, since existing equipment for moving-bed sand filtration can easily be adapted.

The invention will now be explained in more detail with reference to the FIGURE.

BRIEF DESCRIPTION OF THE DRAWING

The FIGURE shows a schematic, sectional representation of the apparatus.

DESCRIPTION OF THE PREFERRED EMBODIMENT 1 indicates a reactor tank with a riser 2 located centrally therein. The reactor tank is filled with a mixture of granular material, such as sand, and adsorbent particles or desorbent particles having a diameter of less than 200 $\mu$m. The granular material (sand bed) has the function of maintaining the relative position of the adsorbent or desorbent particles. In addition, it will become clear from the following that the granular material acts as a countercurrent column.

To prevent the adsorbent particles or desorbent particles from being flushed from the granular bed, they must not be too small. A minimum of 10 to 50 $\mu$m will generally have to be kept to, depending on the size of the granular material. Choosing the diameter of the particles to be smaller than 200 $\mu$m and preferably between 20 and 100 $\mu$m will result in achieving better than excellent separation efficiency.

Fitted to the bottom end of the riser 2 is a supply line 3 for compressed air. The top end of the riser 2 ends in a separator 4 for separating granular material and adsorbent particles or desorbent particles from one another.

The inlet of influent liquid, from which dissolved organic or inorganic constituents must be removed by adsorption or which serves as an extraction fluid for removing soluble constituents from the desorbent particles, is indicated by 5 and the outlet of said liquid by 6. This outlet is fitted, for example, to a weir trough 7 at the upper rim of the tank 1.

In the riser 2, the mixture of granular material and laden adsorbent particles or unladen desorbent particles is directed upwards by compressed air from the line 3 to the separator 4, the tube 2 and compressed-air supply acting as a gas-lift pump. For that matter, discharge of the bed can also take place by means other than a gas-lift pump, for example by means of screw conveyors, hoppers, belts, slurry pumps and the like; moreover, this does not necessarily take place by means of a riser within the reaction tank, but can also happen outside it.

The granular bed containing adsorbent particles and desorbent particles moves continuously downwards countercurrent to the liquid which is supplied via the line and distribution means 5 and moves upwards in the direction of the trough 7, from which effluent is discharged via line 6.

In the separator 4, the granular material is separated from the adsorbent particles or desorbent particles. The separated-off granular material is returned via outlet 8 to the reactor tank 1, and the separated-off adsorbent particles or desorbent particles may, if required, be passed via a line to a concentration means 10, where the slurry of particles is separated into a liquid stream 11, which can either be discharged or returned to the line 5, and a more highly concentrated particle slurry 12.

Particle slurry 12, in the case of extraction, is discharged to a subsequent treatment step and in the case of adsorption chromatography to a regeneration means 13 where the particles are regenerated by a desorption method known per se (for example by chemical solvents, increase in temperature, reduction in pH, chemical oxidation, etc.).

The separated-off components or residual products are discharged via line 14, and the regenerated adsorbent particles 15 are recycled into the bed of granular material via line 16. In the case of extraction, the particles to be treated are introduced into the bed via the line and distribution means 16, with the option, if required, of partial recirculation of extraction fluid taking place by—possibly a portion of—the effluent stream 6 being recycled to influent inlet 5.

The packed bed in the tank has a top stabilization section 17 comprising inert material, a middle adsorption section or extraction section 18 comprising inert granular material mixed with adsorbent particles or desorbent particles, and a bottom discharge section 19 which comprises inert granular material and laden adsorbent particles or desorbent particles.

The process is continuous; the contact times between liquid and adsorbent or desorbent particles are short, due to the small dimensions of the particles, while nevertheless, owing to the countercurrent principle, excellent efficiency is achieved.

Specific examples of use of the above-described adsorption methods or extraction methods are:

1. The removal of organic components from cooling water in circulation cooling systems. Such cooling systems are used very widely and will find ever increasing use. Organic additives are employed, inter alia to prevent the growth of algae and mucilaginous bacteria. These additives are generally discharged without treatment via an effluent stream. Recovery or removal of these agents (estimated at 500 metric tonnes per year) is usually necessary to permit low-standard reuse of the water in the plant and/or to allow the water to be discharged without any environmental restrictions.
2. The treatment of substreams in the textile finishing industry, such as biocides from destarching streams, dyes from rinsing lines, detergents from various water streams. The water consumption in the textile industry is about $10^6$ m$^3$ per year in the Netherlands.
3. The treatment of percolation water, irrigation water and decontamination fluids used in horticulture. In addition to considerable amounts of inorganic substances, these liquids generally contain one or more organic crop protection agents. Many thousands of companies are registered in greenhouse horticulture, which between them consume about 2200 metric tonnes of crop protection agents per year.
4. Recovery of expensive or not readily degradable components from flush water used for flushing equipment in between the batches of the production of chemicals such as fine chemicals in, inter alia, the pharmaceutical industry or the fermentation industry. The market value of these recovered products is roughly from 10 to 3000 guilders per kg.
5. Treatment of the wash streams and flush streams used in the chemical industry. One example to be mentioned is the production of epichlorohydrin, in the course of which a sizeable process water stream is produced that contains large amounts of oxygen-binding substances of low concentrations of some persistent organochlorine compounds. Selective removal is highly desirable on economic and environmental grounds.
6. Polishing of effluencts of sewage treatment plants, in order to minimize the level of not readily degradable components.
7. Treatment of contaminated ground water.
8. Extraction of oleiferous seeds. This requires milder techniques, in order to improve the oil quality: by using small seed pallets (not feasible in columns and the like) it may be possible to greatly reduce the time-temperature factor.
9. Treatment of contaminated sludge with the aid of solvent extraction. Here it may also be possible to use the adsorption variant, so as to regenerate the extraction fluid again.

What is claimed is:

1. Method for adsorbing, on solid adsorbent particles, constituents dissolved in liquid or for desorbing (extracting), from solid desorbent particles, soluble constituents in liquid, characterized in that in a container a packed bed is formed from granular material, mixed with adsorbent particles or desorbent particles smaller than 200 $\mu$m, in that said bed moves downwards by virtue of gravity, in that said liquid is directed upwards through the bed by means of a pressure differential, said dissolved constituents being adsorbed on the solid adsorbent particles or the soluble constituents being extracted from the desorbent particles.

2. Method according to claim 1, characterized in that the packed bed comprises the following sections
   a top section which comprises inert granular material and imparts stability to the bed,
   an adsorbent or desorbent middle section comprising inert granular material mixed with adsorbent particles or desorbent particles, and
   a bottom section which is to be discharged and comprises inert granular material and laden adsorbent particles or desorbent particles.

3. Method according to claim 2, characterized in that the adsorbent particles or desorbent particles are fed in approximately between the top and middle bed section in a concentrated slurry by means of an injection distribution means and in that the influent is introduced approximately between the bottom and middle bed section and the effluent is removed from the top bed section.

4. Method according to claim 1, characterized in that the adsorbent particles or desorbent particles are transported in the bottom bed section to a point above the top bed section, the granular material and the adsorbent particles or desorbent particles are separated from one another, the separated-off granular material is returned into the top bed section and the separated-off adsorbent particles or desorbent particles are discharged.

5. Method according to claim 4, characterized in that the transport of the adsorbent particles or desorbent particles to a point above the top bed section makes use of a gas-lift pump effect, which involves a pressurized gas being passed into the bottom end of a central pipe.

6. Method according to claim 1, used for adsorbing, on solid particles, constituents dissolved in liquid, characterized in that the laden adsorbent particles are regenerated and are recycled into the process.

7. Method according to claim 6, characterized in that the laden adsorbent particles, are concentrated prior to being regenerated.

8. Method according to claim 6, characterized in that the regeneration takes place by means of desorption with the aid of acid or alkali.

9. Method according to claim 6, characterized in that the regeneration takes place with the aid of catalytic oxidation using ozone, peroxide or some other oxidant.

10. Method according to claim 1, used for adsorbing, on solid particles, constituents dissolved in liquid, characterized in that, in addition to the dissolved constituents, non-dissolved constituents are also removed with the liquid.

11. Apparatus for bringing small solid particles in a liquid stream into contact countercurrently, in particular for implementing the method according to claim 1, characterized by
    a column containing a packed bed comprising three layers whose bottom two layers comprise granular material with small adsorbent particles or desorbent particles trapped in between and the top layer comprises a covering layer of granular material,
    means for discharging the bottom layer, as a result of which the packed bed moves slowly downwards at a controlled velocity,
    means for injecting and distributing a liquid between the bottom and middle layer and for discharging said liquid above the top layer,
    means for injecting, between the middle and top layer, a concentrated slurry dispersion of small particles and distributing it in such a way that these particles are entrained through the downward-moving packed bed, countercurrent to a liquid flowing upwards,
    means for separating the discharged slurry, which comprises granular material and small particles forming the bottom layer, into granular material and small particles.

12. Apparatus according to claim 11, characterized by means for concentrating laden adsorption particles or unladen desorption particles.

* * * * *